Dec. 9, 1924.                                                                                              1,518,986
F. P. KRUSE
PISTON CONSTRUCTION
Filed Feb. 9, 1923
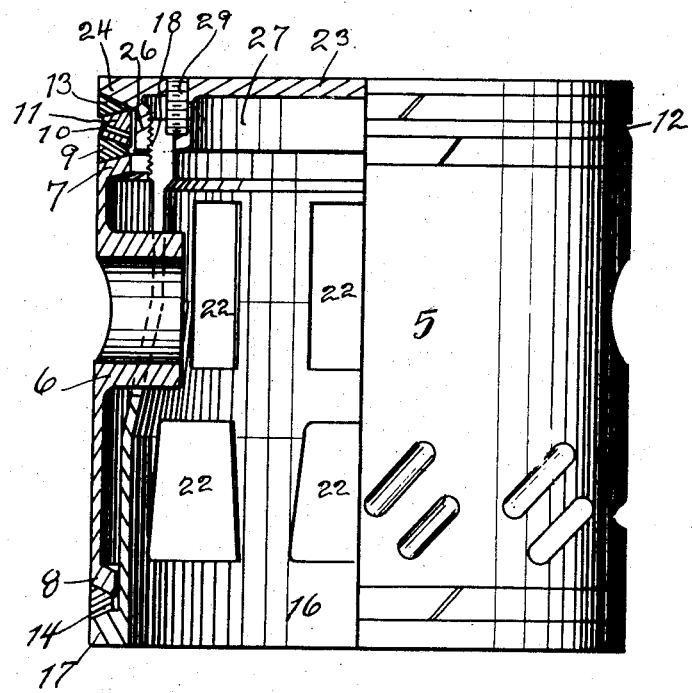
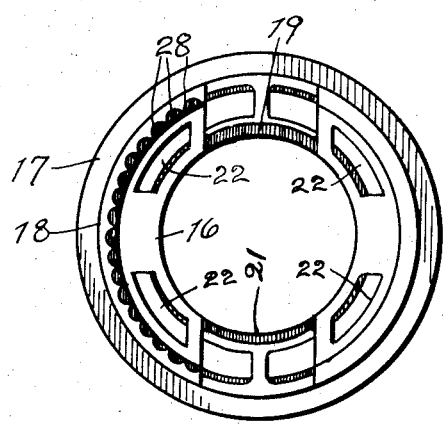
INVENTOR
FREDRICK P. KRUSE
ATTORNEY Patented Dec. 9, 1924.

1,518,986

UNITED STATES PATENT OFFICE.

FREDERICK P. KRUSE, OF VALLEJO, CALIFORNIA, ASSIGNOR OF ONE-THIRD TO HOWARD W. BARR AND ONE-THIRD TO PAUL P. NOYES, OF VALLEJO, CALIFORNIA.

PISTON CONSTRUCTION.

Application filed February 9, 1923. Serial No. 618,119.

*To all whom it may concern:*

Be it known that I, FREDERICK P. KRUSE, a citizen of the United States, residing at Vallejo, in the county of Solano and State of California, have invented new and useful Improvements in Piston Constructions, of which the following is a specification.

This invention relates to improvements in piston construction, the principal object of which is to provide a piston which will prevent the passing of gases confined above the piston head during the compression and expansion stroke of the engine.

Another object is to provide means for adjusting the piston to compensate for the usual wear resulting in long service.

Another object is to provide means whereby the piston will be properly lubricated at all times.

A still further object is to provide means whereby the lubricant is held upon the outer surface of the piston and at the same time to provide means to prevent this lubricating medium from reaching the top of the piston.

A still further object is to provide means whereby the piston rings are relieved from their friction with the cylinder walls except during the compression and expansion strokes only, and to further provide means for preventing side play or what is commonly known as "piston slap".

Other objects and advantages will be apparent during the course of the following description.

In the accompanying drawings forming a part of this specification, and in which like numerals are employed to designate like parts throughout the same, Figure 1 is a side elevation of a piston constructed in accordance with my invention, and partly broken away, in order to better disclose the same, and Figure 2 is a top plan view of an inner piston cage.

Applicant is aware of the fact that attempts have been made to provide means on a piston for the purpose of preventing the passage of gases or oil past the piston. These means, however, have failed in that the friction upon the side wall of the cylinder would result in heating and extensive wear.

I have therefore overcome this difficulty by providing a wedge-shaped ring which contracts the usual expansion rings which are also beveled with the result that upon the down stroke of the piston, the wedge-shaped ring will tend to push the upper expansion ring outwardly and therefore form a better seal. The same action results from the thrust of the connecting rod attached to the piston when the piston is moving upon the up stroke.

A similar expansion ring is mounted at the lower end of the piston for the purpose of contacting the cylinder wall and at the same time this ring prevents piston slap.

I have also provided oil holes through the wedge-shaped ring, which oil holes communicate with the interior of the piston thereby providing means for furnishing or draining from the cylinder wall surface all excess oil.

In the accompanying drawings wherein for the purpose of illustration is shown a preferred embodiment of my invention, the numeral 5 designates the usual piston, which comprises a circular portion having bosses 6 formed thereon for the reception of a wrist pin. This piston is provided at its opposite ends with inturned flanges as shown at 7 and 8.

It will be also noted by viewing Figure 1 that these flanges are formed upon an angle. At 9 I have shown an expansion ring which is also provided with inclined sides adapted to rest upon the inclined flange 7.

At 11 I have shown a wedge-shaped ring preferably made of a hardened steel which ring contacts the upper beveled surface of the expansion ring 9. By viewing Figure 1, it will be also noted that this wedge-shaped ring has its outer face inclined upwardly as shown at 12 and is provided with oil holes as shown at 10.

Resting upon this ring 11 is a second expansion ring 13. At 14 I have shown an expansion ring also provided with beveled sides which is adapted to contact the lower flange 8 of the outer piston 5. An inner piston or cage 16 is provided which cage has an annular flange 17 provided with an inclined surface which inclined surface is adapted to contact the under surface of the ring 14. This cage 16 extends upwardly through the outer piston 5 and has its upper end slightly contracted and provided with a screw thread 18. By viewing Figure 2, it will be noted that this cage is cut away as shown at 19 and 21 to accommodate for the wrist pin bosses and is also orificed as shown at 22 in order to produce a lighter structure.

A cylinder head 23 is provided, which cylinder head has a flange 24 beveled so as to contact the ring 13. This piston head is formed with a downwardly extending annular flange 26, which is internally threaded so as to engage the screw thread 18 of the cage.

An annular flange 27 is also formed upon the cylinder head so as to contact the inner surface of the cage thereby maintaining the threaded portion 18 in contact with the screw threads of the flange 26. In order to prevent rotation of the cylinder head with respect to the cage, I provide a series of depressions as shown at 28 within which a screw 29 is adapted to be seated. By passing the same through the head of the cylinder 23, in order to secure an accurate adjustment, I provide two openings through the cylinder head which are staggered so that one of these openings will always be in a line with one of the recesses 28. The opening not being used by the screw 29 is plugged in order to prevent the escape of gas therefrom. Upon the surface of the outer piston I form inclined staggered oil recesses as shown at 31 which recesses are adapted to gather oil and assist in distributing the same.

In assembling my device the cage 16 is placed upon a suitable support and the expansion ring 14 is dropped thereon. The outer piston is then placed over the cage so as to bring the flange 8 into contact with the upper surface of the ring 14. I then place a ring 9 upon the flange 7 and a wedge-shaped ring upon the expansion ring 9.

A second expansion ring 13 is then superimposed upon the wedge ring 11 after which the cylinder head is screwed down upon the cage 16, until the flange 24 contacts the ring 13. This piston head is then adjusted so as to place a proper tension upon the rings and the screw 29 is inserted in order to prevent rotation of the head with respect to the cage.

After being thus assembled the piston and its attached rings are placed in the engine cylinder and function as follows:—

During the upstroke or compression stroke the thrust of the outer piston causes the flange 7 to push on the ring 9, which being wedge-shaped tends to move outwardly against the wall of the cylinder. This same thrust is also transmitted through the wedge ring 11 to the expansion ring 13. The expansion ring 14 will merely expand against the cylinder wall and thereby hold the piston in proper alignment. Upon the expansion stroke the piston head moving downward against the resistance of the crank will perform the same function of causing the rings 13, 8 and 9 to move outwardly. At the same time any excess oil which may be upon the cylinder wall will be scraped therefrom and will discharge through the oil holes 10.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a device of the character described, a piston having inclined flanges at its opposite ends, a wedge-shaped expansion ring contacting one of said flanges, a wedge-shaped expansion ring contacting the other of said flanges, a non-expanding wedge-shaped ring superimposed on said last mentioned expansion ring, a piston head having an inclined flange, an expansion ring interposed between said flange and said non-expanding ring, a cage having an outwardly extending inclined flange adapted to contact said first mentioned expansion ring, said cage extending through said piston and having screw threaded engagement with the said piston head and means for locking said piston head against rotation with respect to said cage.

In testimony whereof I affix my signature.

FREDERICK P. KRUSE.